Nov. 8, 1932.  L. B. SLICHTER  1,886,914
LOCATING LEAKS IN RESERVOIRS
Filed Nov. 20, 1928  2 Sheets-Sheet 1
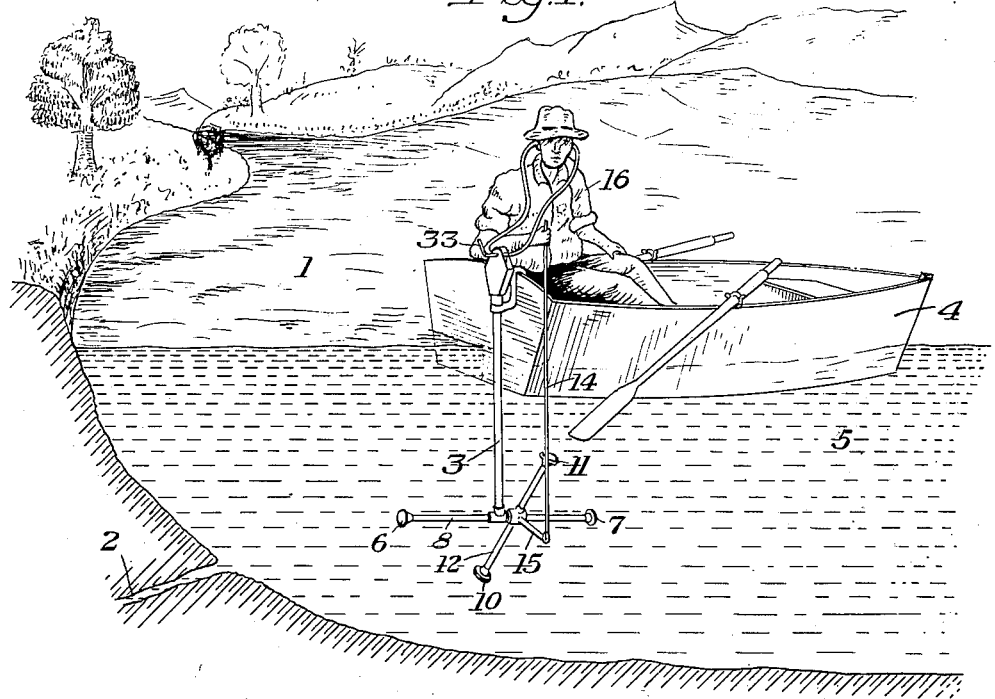
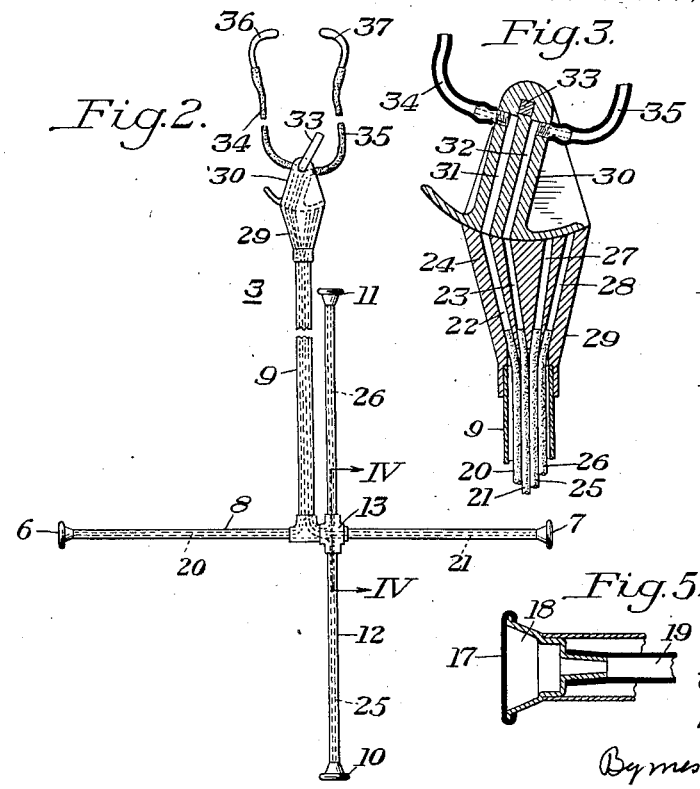
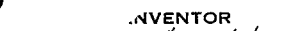
INVENTOR
Louis B. Slichter
by his attorneys
Byrnes, Stebbins & Parmelee Nov. 8, 1932.  L. B. SLICHTER  1,886,914
LOCATING LEAKS IN RESERVOIRS
Filed Nov. 20, 1928  2 Sheets-Sheet 2
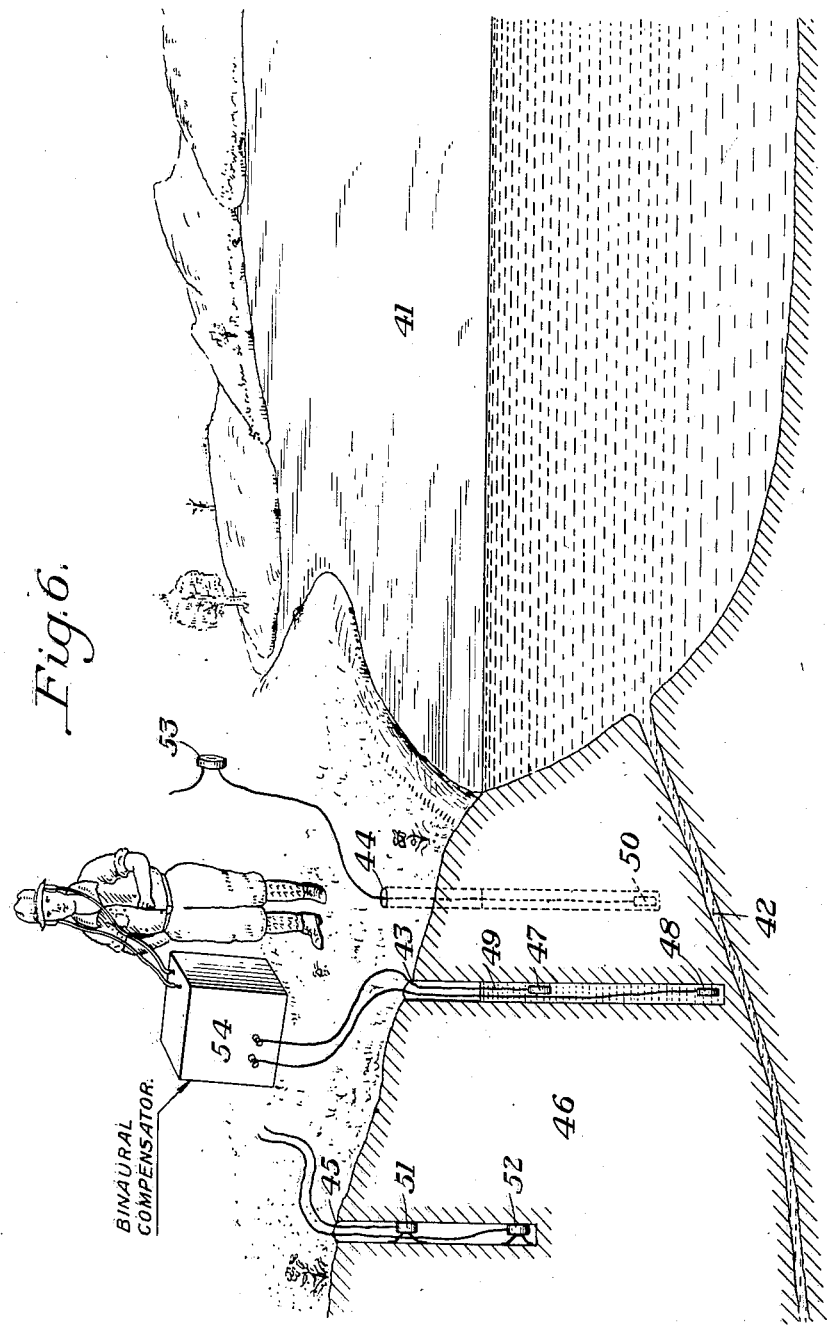
INVENTOR
Louis B. Slichter
by his attorneys
Byrnes, Stebbins, Parmelee & Blenko Patented Nov. 8, 1932

1,886,914

UNITED STATES PATENT OFFICE

LOUIS B. SLICHTER, OF MADISON, WISCONSIN, ASSIGNOR TO MASON, SLICHTER & GAULD, INC., OF MADISON, WISCONSIN, A CORPORATION OF WISCONSIN

LOCATING LEAKS IN RESERVOIRS

Application filed November 20, 1928. Serial No. 320,666.

The present invention relates to the locating of leaks in reservoirs and particularly to the method and apparatus employed for this purpose.

I have found that when the water passes out through a leak in the reservoir, such as a leak through a subterranean passage or through a hole in a reservoir dam, sufficient sound is produced and propagated through the water in the reservoir so that the leak may be located by listening to such sound by a suitable subaqueous listening device which can be utilized to determine the direction of the sound traveling through the water and thus locate the leak. The subaqueous listening device is preferably constructed with a plurality of subaqueous sound receivers which may be spaced horizontally to determine the strike of the sound direction and spaced vertically to determine the dip of the sound direction through the water. Water is a much better medium for the conduction of sound than is air.

The relatively slight gurgling sound of escaping water from a reservoir will be transmitted for a considerable distance into the water of the reservoir, so that a subaqueous sound detector carried by a boat may be immersed in the water in the reservoir, and by listening, the direction of the sound through the water may be determined and thus the leak definitely located as to position.

Instead of immersing the sound detectors in the water of the reservoir, a sound detector may be submerged in a drill hole or holes located in the general vicinity of the leak and the leak located by determining the intensity or direction of the sound as observed by such detector or detectors as hereinafter more fully described.

In the accompanying drawings, there is illustrated a very simple or elementary type of subaqueous sound-detecting device suitable for this purpose. In the drawings:

Figure 1 is an elevation partly in section of a reservoir and a detecting device shown as immersed therein;

Figure 2 is an elevation of the sound-detecting device;

Figure 3 is a detail showing a switching arrangement for connecting the listening stethoscope to either set of receivers;

Figure 4 is a section along the line IV—IV of Figure 2;

Figure 5 is a sectional detail through one of the submarine receiving units; and Figure 6 is an elevation, partly in section, illustrating the detection of the leak by detectors placed in drill holes.

Referring to the embodiment of the invention illustrated in the drawings, a water reservoir is indicated by reference numeral 1. A subterranean passage or leak is indicated at 2. The listening device, indicated generally by reference numeral 3, is shown as carried by a boat 4, floating on the water 5 of the reservoir.

The detecting device comprises two sets of receiving units, one for determining the horizontal direction or strike of the sound and the other for determining the inclination of the sound to the vertical or its dip. The receiving units 6 and 7 are mounted on a horizontal arm 8, which may be turned about a vertical axis by means of the vertically extending support or post 9, which is rotatably supported at its upper end by a bracket on the boat. The other set of receiving units 10 and 11 are carried on an arm 12, so that they are spaced apart vertically in order to determine the dip of sound. The arm 12 is shown as journaled about the arm 8 as a shaft so that it will turn around the arm 8 as a horizontal axis. The bearing of the arm 12 is indicated at 13. The arm 12 may be turned by means of manually manipulated rod 14, attached to a lever arm 15 extending from the arm 12.

The units 6 and 7 and the units 10 and 11 are spaced about four feet apart. Because of the greater speed of travel of sound through water than through air this four-foot spacing corresponds approximately to the spacing apart in air of the ears of the observer, as indicated by reference numeral 16, in the boat.

Each receiving unit comprises a sound-transmitting wall or diaphragm, one surface of which is exposed to the water and the other to an air column leading to the observer. In Figure 5 is shown an elementary form of receiving unit. This consists of a fairly heavy soft rubber wall or diaphragm 17, covering the opening of the chamber 18, which is connected to a rubber tube 19.

The subaqueous sound waves vibrate the diaphragm 17 and set up air sound waves in the chamber 18, which pass through into the rubber tube or air column 19. The receiver 6 is shown as connected to a rubber tube 20, and the receiver 7 to a rubber tube 21, these tubes terminating in passages 22 and 23 in a suitable switching device, indicated generally by reference numeral 24. The receiver 10 is shown as connected to a rubber tube 25, and the receiver 11 to a rubber tube 26, these tubes being connected, respectively, to the passages 27 and 28 in the switching device 24. The switching device is shown as having a stationary part or base 29, containing passages 22, 23, 27 and 28. A movable part or valve 30 is arranged to be turned so that its air passages 31 and 32 may be connected to the passages 22 and 23 or to the passages 27 and 28, respectively, by turning the valve 30 by means of a handle 33. The passages 31 and 32 lead to flexible rubber tubes 34 and 35, respectively, which terminate in the ear pieces 36 and 37 of a stethoscope.

The ear pieces 36 and 37 of the stethoscope may thus be connected to the receiving units 6 and 7, or to the receiving units 10 and 11, respectively, by manipulating the switching device or valve.

The rubber tubing is sufficiently flexible so that the arm 12 may be turned to listen for the dip of the sound.

The listener in the boat immerses the listening device 3 in the water and by the valve 30 connects the stethoscope to one of the two sets of receiving units, say, for example, to the set of receiving units 6 and 7. He then turns the listening device about the vertical axis until the sound is binaurally centered, in which case the arm 8 is at right angles to the direction of the sound.

The lengths of the air columns through the rubber tubes and connections from the two receiving units 6 and 7 to the ear pieces 36 and 37 of the stethoscope are the same. Likewise, the lengths of the air columns from the receiving units 10 and 11 to the stethoscope ear pieces 36 and 37 are the same.

When the arm 8 is turned at right angles to the direction of the sound, the sound waves arrive at the same time at the receivers 6 and 7 and through the air columns through the rubber tubing arrive at the same time at the two ears of the listener through the stethoscope ear pieces 36 and 37. When the sound waves arrive at his ears at the same time and therefore in phase, the listener will have the sensation of the sound being centered in his head midway between his ears. If the stethoscope ear piece 36 is inserted in the left ear and the stethoscope ear piece 37 is inserted in the right ear, and the arm 8 is so turned that the receiving unit 6 is nearer to the sound source than the receiving unit 7, then the sound waves will reach the left ear of the listener first and the listener will experience the sensation of the sound being shifted to a position toward the left side of his head.

By turning the arm 8 back and forth about the vertical axis, the listener can shift the location of the sound back and forth as it appears to be located in his head until he gets it centered in the middle of his head, the sensation being that sound is centered about half way between his ears. This manipulation of the device until the sound appears to the listener to be centered in his head is known as "binaural centering".

A listener having normal binaural sense can, with a little practice, determine the direction of the sound within a few degrees by shifting the listening device back and forth until the sound appears to be binaurally centered. With a listening device of the character indicated where the units are mounted on an arm which can be turned, the listener, by turning the arm carrying the listening device back and forth, can readily determine not only the line of direction of sound, but can determine the direction in which the sound is traveling in said line. For example, assume that the stethoscope ear pieces 36 and 37 are inserted, respectively, in the left and right ears of the listener. Now, referring to Figure 2: If the arm 8 is turned around the axis of the post 9, so as to bring the receiver 6 closer to the source of sound, the sound will appear to shift to the left in the head of the listener. If it is moved away from the sound, the sound will appear to shift to the right in the head of the listener. In this way, the observer can tell whether the sound is coming from a direction which would be upward from the sheet of paper on which Figure 2 is drawn or which would be downward through the sheet of paper on which Figure 2 is drawn.

The listener is thus able to get the direction of strike of the sound, that is, to get the direction of the horizontal line upon which the path of the sound is projected. After making this determination, the listener shifts the switching device 24 to connect the stethoscope to the receivers 10 and 11. By manipulating the rod 14, the listener can binaurally center the sound coming through the receiving units 10 and 11, and by observing the inclination of the arm 12, he can get the dip or inclination to the vertical of the direction in which the sound is coming.

The listener can thus locate definitely from his position in the boat the direction from which the sound is coming and thus locate the leak. Usually, the listener will take preliminary observations to get the general location of the leak, and will then go closer to it and take up a number of positions to get a definite line on just where in the reservoir bottom or side the leak is occurring.

In the drawings, there is illustrated for the sake of simplicity an elementary type of submarine sound detector. There are a number of types of submarine sound detectors, such as are described, for example, in the patents of Max Mason, No. 1,422,876 of July 18, 1922, and No. 1,569,292 of January 12, 1926, and in the patent of Harvey C. Hayes, No. 1,470,733 of October 16, 1923.

As described in these patents, the subaqueous sound detector may be of the type in which the receiving units are mounted so as to be turned in the water, and thus locate the direction of the sound; or as described in the Hayes patent, and particularly in Figure 11 thereof, the detecting units may be mounted in a fixed relation to the boat and the direction of sound determined by suitably compensating the paths of wave energy traveling from the subaqueous receivers to the ears of the listener.

I have found that instead of using a sound-detecting device carried by a boat or otherwise immersed in the water of the reservoir, that the location of a leak in the reservoir may be determined by the sound through the earth or rock of the reservoir side or bottom through which the leak is taking place. This may be done by sinking a drill hole or holes in the general vicinity of the leak and placing in such drill hole or holes a sound-receiving unit or units. A rough approximation of the location of a leak may be determined by sinking a drill hole and placing therein a single sound receiver and observing the intensity of the sound. The intensity of the sound may be compared with the intensity of the sounds observed by a sound-receiving unit placed in another or other drill holes, and thus the location of the leak determined.

In Figure 6 there is illustrated more or less diagrammatically methods which may be employed in determining the reservoir leaks by means of sound detectors placed in drill holes. In Figure 6 there is illustrated a reservoir 41 having a leak 42, the location of which is to be detected. There are also illustrated three drill holes 43, 44 and 45, respectively, sunk into the earthen bank or retaining dam 46 of the reservoir. The drill holes 43 and 44 are shown as going below the level of the ground water, while the drill hole 45 is shown as a dry hole. Sound detectors 47 and 48 are shown in the drill hole 43 below the water level 49. There is shown at 50 a single sound detector in the drill hole 44. There is shown in the drill hole 45 two sound detectors 51 and 52, which are vertically spaced and are held against the side of the drill hole 45 by any suitable means.

A rough approximation of the location of the leak may be determined by sinking a drill hole and placing therein a single sound receiver, such as the sound receiver 50, in the hole 44 and observing the intensity of the sound by a suitable listening device 53 which may be a single ear piece. Other drill holes, such as 43 and 45, may be also sunk in the vicinity of the leak and the single sound receiving unit 50 dropped into them and the location of the leak approximated by noting the relative intensity of the sound obtained from the different drill holes.

A more accurate determination of the location of the leak with respect to the drill holes may be obtained by employing a plurality of sound-receiving units and a binaural compensator. Such a binaural compensator is indicated by reference numeral 54 and is preferably of the type shown in the Hayes Patent 1,470,733, utilizing microphones for the sound-receiving units which are indicated by reference numerals 47, 48, 50, 51 and 52. Since the location of the drill holes is fixed, some compensating device, like that of the Hayes patent, should be employed for binaural listening. The compensator 54 is illustrated as connected with the vertically spaced sound-receiving units 47 and 48. The dip or vertical direction of the leak from the line joining the sound receivers 47 and 48 may be read on the compensator.

To determine the strike or the horizontal direction of the leak from the drill holes, two drill holes are employed each having a sound-receiving unit. For example, in the drawings the sound-receiving unit 48 in the drill hole 43 and the sound-receiving unit 50 in the drill hole 44 may be both connected to the compensator 54 and the strike or horizontal direction of the leak with relation to the horizontal line joining the drill holes 43 and 44 may be determined. The location of the leak can thus be determined both as to strike and dip.

It is found that the sound from the leak is transmitted through the ground, particularly through rock or water-soaked ground in the vicinity of the reservoir and the sound may be readily picked up by subaqueous sound receivers immersed in the water in the drill holes.

While it is preferred in the case of drill holes to sink the holes into the water-bearing stratum of the earth and to employ subaqueous receivers immersed in the water, other forms of sound receivers may be used submerged in the drill holes in either the wet or dry earth, to determine the direction of the sound.

In Figure 6 there is also illustrated a dry drill hole 45 in which the sound-receiving units are not immersed in water as they are in the drill holes 43 and 44. The vertically spaced sound-receiving units 51 and 52 in the drill hole 45 can be connected to the binaural compensator to determine the dip of the leak with reference to the sound-receiving units, and the strike can be determined as above described by placing one sound-receiving unit in the drill hole 45 and a second sound-receiving unit in another drill hole.

It has been found by tests that leaks in reservoirs may be quickly and accurately located by the procedure herein described. By the term "reservoir" is meant any confined body of water, such as a storage reservoir, mill pond, or other confined or dammed body of water.

It will be apparent from the description given above, and particularly by reference to other types of subaqueous sound-detecting devices, that the invention is not limited to the particular or elementary form of detector illustrated, but that other forms of subaqueous sound directional detecting device may be used and that the method may be otherwise embodied, all within the scope of the following claims.

I claim:

1. The method of locating leaks in reservoirs, which comprises receiving the aqueous sound waves in the water of the reservoir in a plurality of subaqueous receiver units, and determining by such received sound the location of the leak.

2. The method of locating leaks in reservoirs, which comprises listening to the sound emanating from the leak with a subaqueous sound directional detector immersed in the water of the reservoir.

3. The method of locating leaks in reservoirs, which comprises submerging a plurality of sound-receiving units in position to receive sound emanating from the leak, listening to the sound received by such units, and determining by such received sounds the direction of the leak.

4. The method of locating leaks in reservoirs, which comprises submerging a plurality of sound-receiving units in position to receive sound emanating from the leak, spacing the units apart both horizontally and vertically, and determining thereby both the strike and dip of the direction of the sound emanating from the leak.

5. The method of locating leaks in reservoirs, which comprises sinking a drill hole or holes in position to receive sound emanating from the leak to a depth where water is present in the bottom of the hole or holes, immersing a plurality of subaqueous sound-receiving units in the water, and determining by such sound-receiving units the direction of the sound emanating from the leak.

6. Apparatus for locating leaks in reservoirs, comprising sound receivers spaced apart both horizontally and vertically and positioned so as to receive sound from the leak to be located, separate paths for conducting sound energy from horizontally spaced receivers to the two ears of a listener, means for indicating the strike of the direction of the sound coming from the leak when binaural centering is attained, separate paths for conducting sound energy from vertically spaced receivers to the two ears of a listener, and means for indicating the dip of said direction of sound when binaural centering is obtained.

7. Apparatus for locating leaks in reservoirs, comprising sound receivers spaced apart both horizontally and vertically and positioned so as to receive sound from the leak to be located, means for conducting sound energy from horizontally spaced receivers, means for indicating the strike of the direction of sound coming from the leak, means for conducting sound energy from vertically spaced receivers, and means for indicating the dip of the said direction of sound.

In testimony whereof I have hereunto set my hand.

LOUIS B. SLICHTER.